No. 892,005. PATENTED JUNE 30, 1908.
T. H. NAUGHTON.
PROCESS OF RECOVERING WASTE ALCOHOL FROM LIQUOR CASKS
AND BARRELS.
APPLICATION FILED NOV. 23, 1907.
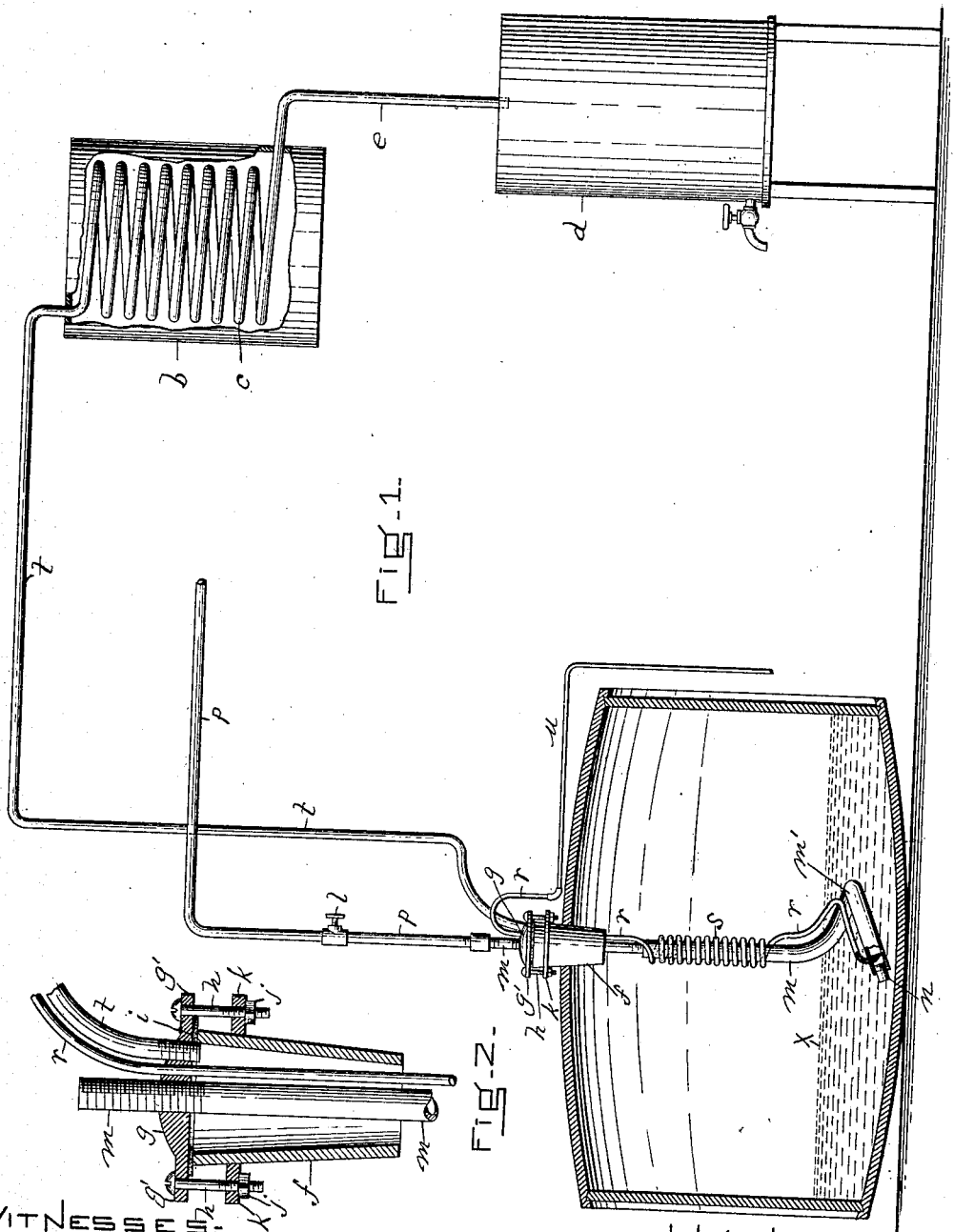

UNITED STATES PATENT OFFICE.

THOMAS HENRY NAUGHTON, OF PHILADELPHIA, PENNSYLVANIA.

PROCESS OF RECOVERING WASTE ALCOHOL FROM LIQUOR CASKS AND BARRELS.

No. 892,005.　　　Specification of Letters Patent.　　　Patented June 30, 1908.

Application filed November 23, 1907. Serial No. 403,498.

*To all whom it may concern:*

Be it known that I, THOMAS HENRY NAUGHTON, a citizen of the United States, residing in Philadelphia, in the county of Philadelphia and State of Pennsylvania, have invented a new and Improved Process of Recovering Waste Alcohol from Liquor Casks and Barrels, of which the following is a specification.

This process has for its object to extract and recover the alcohol which remains in the barrels or casks which have contained liquors or wines and which have been emptied of their contents as much as is ordinarily the case, but which still contain, especially in the charred inner surface of the wood of which the barrels are made, more or less liquor or alcohol; the present process being particularly adapted for recovering the waste alcohol from individual barrels rather than from a series of connected barrels. In this process I first pour into the emptied barrel, which is preferably laid on its side for the purpose, a sufficient quantity of water to produce when subjected to heat enough vapor to fill the interior of the barrel and to come in contact with all portions of its charred inner surface. I then insert in the bung-hole in the barrel a hollow bung opening into the barrel but having a closed top, said bung supporting a steam-heating pipe or main whose lower end is closed and extends below the surface of the water, the said lower end being of such shape that a considerable portion of the heating pipe is submerged. Steam is applied to this pipe, with the effect of vaporizing the water, and the vapor, which completely fills the barrel and comes in contact with all parts of its charred inner surface, volatilizes the alcohol contained in the barrel, and said vapor carrying the volatilized alcohol is conducted through and from the interior of the bung to a worm in a condensing tank and thence to a receiving tank. A discharge-pipe connected with the lower end of the interior of the steam-heating pipe carries off the condensed steam in said lower end.

The accompanying drawings, in which similar letters of reference indicate corresponding parts, show an apparatus for carrying out my process, said apparatus being the subject of a separate application for Letters Patent of even date herewith.

In the drawings, Figure 1 is an elevation of this apparatus applied to a barrel which is illustrated as lying on its side, the said barrel and a small portion of the lower end of the apparatus being shown in section, and the apparatus connecting with a suitable condensing tank (broken out in order to show the worm) and a receiving tank shown in elevation. Fig. 2 is an enlarged section in detail of the bung and its cap, the parts connecting with said bung and extending through it being shown in elevation.

*a* represents a liquor or wine barrel or cask which has been emptied of its contents and is lying on its side.

*b* represents a condensing tank provided with a suitable worm *c*, and *d* is a receiving tank which is connected with the worm by the pipe *e*.

*f* is a hollow bung, made preferably of wood instead of metal in order to avoid the necessity of a screw-thread, the bung being of the usual conical shape, and *g* is a metallic cap whose annular flange *g'* is bored to receive bolts *h* which screw into a metallic ring *k* which is disposed around the conical bung at a short distance below its upper end. Nuts *j* on the bolts serve to force the cap *g* down upon the washer *i* which is between said cap and the upper edge of the hollow bung, the ring *k* being prevented by the expanding shape of the bung from being forced any higher than the point illustrated in the drawings.

*m* represents a heating pipe or main, closed at its lower end, preferably by means of a stopple *n*, said lower end being adapted to rest on the inner surface of the barrel at its lowest portion as it lies, and the lower portion *m'* of the heating pipe being preferably bent or coiled in order to provide a greater heating surface. This pipe extends up centrally through the tubular bung *f* without coming in contact therewith and thereby burning or injuring it, and through the metallic cover *g*, into which it is screwed. The upper end of the pipe *m* is screwed into the lower end of a pipe *p* which connects with a steam-supply, and is provided with a suitable valve *l*. Near the extreme lower end of the pipe *m* a small pipe *r* connects with its interior and coils at *s* around the pipe *m* and extends from the upper end of such coiled portion through the cap *g* to the waste or discharge-pipe *u*. A pipe *t* has its lower end screwed into the cap *g* whereby it opens into the interior of the bung $f$, said pipe $t$ extending to and connecting with the worm $c$ in the condensing tank $b$.

In carrying out my process by means of the above described apparatus, I first pour water into the emptied barrel to such a level, say at $x$, that when the water is subjected to heat it will become vaporized to such an extent as to fill the interior of the barrel and cause the vapor to be in contact with all portions of its charred inner surface. I then insert the apparatus in the barrel in the manner illustrated, the bung $f$ fitting in the bung-hole and the portion $m'$ of the main steam-heating pipe $m$ being submerged, and turn on steam by means of the valve $l$, thus causing said portion $m'$ to heat and vaporize the water and volatilize the alcohol contained in the charred inner surface, and said vapor carries the volatilized alcohol out through the interior of the bung into the pipe $t$ and thence through the worm $c$ in the condensing tank $b$, and through the pipe $e$ into the receiving tank $d$. The valve $l$ is turned on to such an extent that the inflow of steam is sufficient to drive the water produced by condensation in the lower end of the steam-pipe up through the pipe $r$ and the coil $s$ therein into the discharge-pipe $u$.

Having thus fully described my invention, what I claim, and desire to secure by Letters Patent is:—

The hereindescribed method of recovering waste alcohol from a practically empty liquor cask or barrel, which consists in introducing into the barrel water sufficient in quantity to when vaporized come in contact with all portions of the inner surface of the barrel, introducing a closed steam-heating main pipe into the barrel to such an extent that a portion of said pipe is submerged by the water; driving steam into said pipe and through the submerged portion until the water is thoroughly vaporized, conducting the vapor in the interior of the barrel together with the volatilized alcohol contained therein to a suitable condenser, and conducting the water or steam which has been driven through the main to a point outside the barrel without allowing it to escape into the barrel, substantially as described.

In testimony whereof I have signed my name to this specification in the presence of two subscribing witnesses.

THOMAS HENRY NAUGHTON.

Witnesses:
   HENRY W. WILLIAMS,
   M. A. ATWOOD.